Patented July 23, 1940

2,208,935

UNITED STATES PATENT OFFICE 2,208,935

PREPARATION OF HEXAMETHYLENE AMMONIUM HEXAMETHYLENE DITHIOCARBAMATE

Arthur M. Neal, Wilmington, Del., and Bernard M. Sturgis, Pitman, N. J., assignors to E. I. du Pont de Nemours & Company, Wilmington, Del., a corporation of Delaware No Drawing. Application September 7, 1939, Serial No. 293,762

16 Claims. (Cl. 260—239)

This invention relates to the preparation of organic derivatives of hexamethylene imine and more particularly to methods of preparing hexamethylene ammonium hexamethylene dithiocarbamate.

Dithiocarbamic acid and substituted dithiocarbamic acids and their salts are old in the art. Ammonia, for example, in alcoholic solution reacts readily with carbon disulfide to form the ammonium salt of dithiocarbamic acid. The free acid is extremely unstable and decomposes immediately. In a similar manner, dithiocarbamic acid derivatives can be prepared from primary or secondary alkyl amines, or imines such as piperidine. These compounds, particularly the ammonium and substituted ammonium salts of the dithiocarbamic acids, are all more or less unstable even at room temperature. The piperidine salt of pentamethylene dithiocarbamic acid, for example, is a pale cream colored solid which slowly decomposes at room temperature, and rapidly decomposes at elevated temperatures or in the presence of moisture. The deterioration of the product is accompanied by the formation of a brown color and loss in solubility. A more stable compound, particularly in the presence of moisture and at elevated temperatures, is hexamethylene ammonium hexamethylene dithiocarbamate.

Hexamethylene imine is old in the art. It can be prepared by splitting out ammonia from one molecule of 1,6-diamino hexane. Hexamethylene imine readily reacts with carbon disulfide according to the following equation:

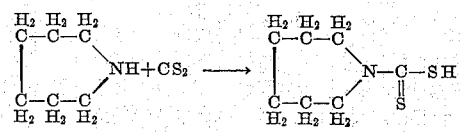

This product immediately reacts with an excess of hexamethylene imine or other basic material to form a salt of the acid. These derivatives of hexamethylene dithiocarbamic acid are all new in the art, and are covered as new compositions of matter by Ira Williams in his copending application Serial No. 212,978 filed June 10, 1938, now Patent No. 2,178,719 issued January 23, 1940.

Piperidine pentamethylene dithiocarbamate has been made in a variety of solvents, as gasoline, acetone, and water. Hexamethylene ammonium hexamethylene dithiocarbamate is a new compound, except for Williams who has disclosed its preparation from pure hexamethylene imine in gasoline.

Hexamethylene imine is usually obtained as an aqueous solution. To obtain this imine in the anhydrous form requires an additional step increasing the cost and labor in producing the dithiocarbamate. Hence, it is desirable to use the aqueous solution of the imine directly for the production of hexamethylene ammonium hexamethylene dithiocarbamate possessing good physical properties and stability.

It is an object of the present invention to provide an improved method for preparing hexamethylene ammonium hexamethylene dithiocarbamate. Another object is to provide a method of preparing hexamethylene ammonium hexamethylene dithiocarbamate directly from aqueous solutions of hexamethylene imine. A further object is to provide a cheaper method for preparing hexamethylene ammonium hexamethylene dithiocarbamate from relatively impure and crude materials, thereby eliminating the necessity for employing costly and laborious purification steps. A still further object is to provide a method for producing high yields of hexamethylene ammonium hexamethylene dithiocarbamate of excellent quality and stability from relatively impure and crude starting materials. Other objects are to advance the art. Still other objects will appear hereinafter.

The above and other objects may be accomplished in accordance with our invention which comprises reacting hexamethylene imine in aqueous solution with carbon disulfide, followed by filtering off the precipitated hexamethylene ammonium hexamethylene dithiocarbamate. Contrary to the expectations from past experience in making other dithiocarbamates, we have found that when carbon disulfide, either alone or in admixture with some mutually inert solvent, such as the water miscible lower alkyl alcohols and ketones, is added to an aqueous solution of hexamethylene imine, high yields of the hexamethylene ammonium hexamethylene dithiocarbamate of excellent purity and stability are obtained. This was unexpected in view of the usual instability of other dithiocarbamates in the presence of water.

As has been heretofore pointed out, hexamethylene imine is nearly always obtained as an aqueous solution. A suitable method for making hexamethylene imine is disclosed in the application of B. W. Howk, Serial No. 127,203, filed February 23, 1937. Such method comprises hydrogenating adiponitrile in an autoclave in the presence of ammonia and an active nickel catalyst to obtain a mixture of hexamethylene diamine and hexamethylene imine. The reaction is carried out under pressure and at elevated temperatures. In the process as it is employed at present, water is added to the reaction mixture, filtered, and the aqueous solution distilled to obtain an aqueous solution of the imine. The water, which is used to dissolve the hexamethylene imine, may contain methyl alcohol, acetone, or the like. We do not claim as our invention such process of making the hexamethylene imine. On the other hand, our invention is directed to the treatment of aqueous solutions of hexamethylene imine and particularly solutions such as are obtained in the above process.

It is costly to prepare the hexamethylene imine in anhydrous form from such aqueous solutions. If, however, a dilute aqueous solution, such as is obtained from the distillation step, is subjected to fractional distillation, the excess water may first be removed and then a binary constant boiling solution of the imine with water distills. This has a boiling point of about 95.5° C. and a composition of about 50.58% imine and 49.42% water. We have found that such constant boiling mixture can be employed satisfactorily for the preparation of hexamethylene ammonium hexamethylene dithiocarbamate. However, it is not necessary to employ the fractional distillation step, since we have also found that dilute aqueous solutions containing from about 5% to about 55% or more of the imine can be employed satisfactorily for the direct preparation of the dithiocarbamate. Such dilute solution of the imine may also contain various impurities such as methanol, ethanol, acetone, inorganic salts and the like, produced in the preparation of the imine. Accordingly, we may treat directly the solution obtained from the distillation step in the above described process of making the hexamethylene imine.

It may be noted that aqueous solutions of hexamethylene imine often become colored upon standing for any considerable length of time, especially in iron containers. If such an imine solution is very deeply colored, it will usually be advisable to distill it in order to remove the color before using such a solution.

Any of the above described aqueous solutions of the hexamethylene imine may be treated with carbon disulfide to produce hexamethylene ammonium hexamethylene dithiocarbamate of good quality and stability. While the carbon disulfide may be added alone to such solutions, the best results will usually be obtained by adding the carbon disulfide in solution in an inert mutual solvent; that is, a solvent which will dissolve both the carbon disulfide and the hexamethylene imine solution. Such solvents are preferably the water miscible lower alkyl alcohols and water miscible lower alkyl ketones, such as acetone, methanol, ethanol, propanol, methyl ethyl ketone, and the like. By the terms "lower alkyl alcohols" and "lower alkyl ketones," we mean the alcohols and ketones of up to six carbon atoms which, except for the oxygen of the hydroxy or ketone group, consist of carbon and hydrogen.

We have further found that the best results are obtained in the presence of a suitable wetting agent such as the sodium salt of isopropylated naphthalene sulfonic acid, long chain alcohol sulfates of the types disclosed in Patent 1,968,797 to Bertsch, long chain betaines of the type disclosed in Patent 2,129,264 to Downing et al. and the like.

The reaction may be carried out under atmospheric pressures at temperatures from as low as −20° C. up to about 46° C., the boiling point of the carbon disulfide. Higher temperatures, up to about 100° C., may be employed if the reaction is carried out in a pressure vessel. However, the reaction will generally and most conveniently be carried out at temperatures from about −10° C. to about 30° C., and preferably at from about 0° C. to about 15° C.

The carbon disulfide may be added to the aqueous solution of the imine in a very few minutes, or it may be added very slowly over a period of several hours. If desired, the mode of addition of the reactants may be reversed, the carbon disulfide being well dispersed in water by means of a suitable wetting agent and the hexamethylene imine solution added thereto. The product may be separated most conveniently by filtration at a low temperature such as from about −10° C. to about room temperature. It may also be separated by filtration at a higher temperature and the material remaining in solution may then be recovered by evaporation of the solvent. The product may be dried at temperatures from about room temperature up to about 70° C. If desired, it may be purified further by washing with water, acetone, alcohol, ether or the like, or by recrystallization, semi-recrystallization or slurrying with one or more of such solvents.

In order to illustrate my invention more clearly, the preferred modes of carrying the same into effect and the advantageous results to be obtained thereby, the following examples are given.

*Example 1*

One hundred forty-five parts of the constant boiling mixture of hexamethylene imine and water, obtained in the production of the hexamethylene imine, was cooled to 10° C. in an ice bath. This constant boiling mixture has a composition of 50.58% imine and 49.42% water, a boiling point of 95.5° C. and a specific gravity at $$\frac{25° \text{ C.}}{25° \text{ C.}} \text{ of } 0.9567$$

This solution then was equivalent to 73.5 parts of pure hexamethylene imine. This imine solution was well stirred while a mixture of 30 parts of carbon disulfide and 30 parts of acetone was slowly added. The white precipitate was filtered off, washed with acetone, and dried at room temperature. A 94% yield of a white crystalline product, melting at 147°–149° C., was obtained.

*Example 2*

To 78.5 parts of 100% hexamethylene imine, as 30% aqueous solution, was added 0.5 part of the sodium salt of isopropylated naphthalene sulfonic acid, a wetting agent. The solution was cooled to 10° C. and well stirred while a mixture of 31 parts of carbon disulfide and 30 parts of acetone was dropped in during half an hour. The stirring was continued for 15 minutes while the material was cooled to 0° C. The product was filtered, sucked for 15 minutes on a suction filter, and then agitated with 125 parts of acetone while the temperature was raised to 50° C. The slurry was then cooled to 0° C. and the product filtered off and washed with 25 parts of cold acetone. The white crystalline product was dried at 45–50° C. The yield of hexamethylene ammonium hexamethylene dithiocarbamate was 93% of theory of material melting at 149°–151° C.

Example 3

Two hundred fifty parts of an aqueous solution containing 29.2% hexamethylene imine, 20% methanol, and small quantities of other impurities was cooled to 15° C. and well stirred while .5 part of the sodium salt of isopropylated naphthalene sulfonic acid as a wetting agent was added, and then 30 parts of carbon disulfide slowly dropped in. After stirring for an hour, the product was cooled, filtered off and washed with cold water. The product was dried at 45° C. The yield was 93% of theory.

While in the above examples, we have shown desirable methods for carrying out our invention, it will be understood that such examples are given for illustrative purposes only and that it is possible to operate the process satisfactorily under a variety of other conditions such as have been heretofore disclosed. In other words, variations can be made in the temperatures, the order of addition of the ingredients, the solvents, the wetting agents, and the methods of separating the product from the solvents and the like.

The hexamethylene ammonium hexamethylene dithiocarbamate has been found to be an excellent accelerator for the vulcanization of rubber, particularly in the form of latex. It is considerably more stable than the corresponding compound made from piperidine and is a much stronger and more active accelerator.

Other dithiocarbamates of this general type are usually made in some organic solvent, such as gasoline, in the absence of moisture. For such processes, it is necessary to use substantially pure anhydrous materials. Since hexamethylene imine is usually produced in water solution, it is advantageous and more economical to employ such aqueous solution directly for the preparation of the dithiocarbamate, as the use of such aqueous solution saves the expense incidental to purifying the hexamethylene imine from water and other impurities. Accordingly, our invention comprises a new, improved and more economical process whereby such dilute aqueous solutions of hexamethylene imine are used directly to produce hexamethylene ammonium hexamethylene dithiocarbamate of excellent quality and possessing great stability and excellent accelerating characteristics.

We claim:

1. The method of preparing hexamethylene ammonium hexamethylene dithiocarbamate which comprises reacting hexamethylene imine in aqueous solution with carbon disulfide.

2. The method of preparing hexamethylene ammonium hexamethylene dithiocarbamate which comprises reacting hexamethylene imine in aqueous solution with carbon disulfide at about −10 to about 30° C.

3. The method of preparing hexamethylene ammonium hexamethylene dithiocarbamate which comprises reacting hexamethylene imine in aqueous solution with carbon disulfide in the presence of a wetting agent.

4. The method of preparing hexamethylene ammonium hexamethylene dithiocarbamate which comprises reacting hexamethylene imine in aqueous solution with carbon disulfide at about −10 to about 30° C. in the presence of a wetting agent.

5. The method of preparing hexamethylene ammonium hexamethylene dithiocarbamate which comprises reacting hexamethylene imine in aqueous solution with carbon disulfide dissolved in a solvent of the class consisting of water miscible lower alkyl alcohols and water miscible lower alkyl ketones.

6. The method of preparing hexamethylene ammonium hexamethylene dithiocarbamate which comprises reacting hexamethylene imine in aqueous solution with carbon disulfide dissolved in a solvent of the class of water miscible lower alkyl ketones.

7. The method of preparing hexamethylene ammonium hexamethylene dithiocarbamate which comprises reacting hexamethylene imine in aqueous solution with carbon disulfide dissolved in a solvent of the class of water miscible lower alkyl ketones, at about −10° C. to about 30° C.

8. The method of preparing hexamethylene ammonium hexamethylene dithiocarbamate which comprises reacting hexamethylene imine in aqueous solution with carbon disulfide dissolved in a solvent of the class of water miscible lower alkyl ketones, at about −10° C. to about 30° C. and in the presence of a wetting agent.

9. The method of preparing hexamethylene ammonium hexamethylene dithiocarbamate which comprises distilling an aqueous solution of the reaction products, obtained by reducing adiponitrile, to separate an aqueous solution of hexamethylene imine therefrom and then reacting the hexamethylene imine in the last mentioned aqueous solution with carbon disulfide.

10. The method of preparing hexamethylene ammonium hexamethylene dithiocarbamate which comprises distilling an aqueous solution of the reaction products, obtained by reducing adiponitrile, to separate an aqueous solution of hexamethylene imine therefrom and then reacting the hexamethylene imine in the last mentioned aqueous solution with carbon disulfide at about −10 to about 30° C.

11. The method of preparing hexamethylene ammonium hexamethylene dithiocarbamate which comprises distilling an aqueous solution of the reaction products, obtained by reducing adiponitrile, to separate an aqueous solution of hexamethylene imine therefrom and then reacting the hexamethylene imine in the last mentioned aqueous solution with carbon disulfide in the presence of a wetting agent.

12. The method of preparing hexamethylene ammonium hexamethylene dithiocarbamate which comprises distilling an aqueous solution of the reaction products, obtained by reducing adiponitrile, to separate an aqueous solution of hexamethylene imine therefrom and then reacting the hexamethylene imine in the last mentioned aqueous solution with carbon disulfide at about −10 to about 30° C. in the presence of a wetting agent.

13. The method of preparing hexamethylene ammonium hexamethylene dithiocarbamate which comprises distilling an aqueous solution of the reaction products, obtained by reducing adiponitrile, to separate an aqueous solution of hexamethylene imine therefrom and then reacting the hexamethylene imine in the last mentioned aqueous solution with carbon disulfide dissolved in a solvent of the class consisting of water miscible lower alkyl alcohols and water miscible lower alkyl ketones.

14. The method of preparing hexamethylene ammonium hexamethylene dithiocarbamate which comprises distilling an aqueous solution of the reaction products, obtained by reducing adiponitrile, to separate an aqueous solution of hexamethylene imine therefrom and then reacting the hexamethylene imine in the last mentioned aqueous solution with carbon disulfide dissolved in a water miscible lower alkyl ketone.

15. The method of preparing hexamethylene ammonium hexamethylene dithiocarbamate which comprises distilling an aqueous solution of the reaction products, obtained by reducing adiponitrile, to separate an aqueous solution of hexamethylene imine therefrom and then reacting the hexamethylene imine in the last mentioned aqueous solution with carbon disulfide dissolved in a water miscible lower alkyl ketone, at about −10° C. to about 30° C.

16. The method of preparing hexamethylene ammonium hexamethylene dithiocarbamate which comprises distilling an aqueous solution of the reaction products, obtained by reducing adiponitrile, to separate an aqueous solution of hexamethylene imine therefrom and then reacting the hexamethylene imine in the last mentioned aqueous solution with carbon disulfide dissolved in a water miscible lower alkyl ketone, at about −10° C. to about 30° C. and in the presence of a wetting agent.

ARTHUR M. NEAL.
BERNARD M. STURGIS.